United States Patent
Ghalehtaki et al.

(10) Patent No.: US 12,373,701 B2
(45) Date of Patent: Jul. 29, 2025

(54) METHOD AND APPARATUS FOR DETECTING AND EXPLAINING ANOMALIES

(71) Applicant: Telefonaktiebolaget LM Ericsson (publ), Stockholm (SE)

(72) Inventors: Razieh Abbasi Ghalehtaki, Québec (CA); Fetahi Wuhib, Québec (CA); Amin Ebrahimzadeh, Québec (CA); Roch Glitho, Québec (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/573,826

(22) PCT Filed: Jun. 30, 2021

(86) PCT No.: PCT/IB2021/055868
§ 371 (c)(1),
(2) Date: Dec. 22, 2023

(87) PCT Pub. No.: WO2023/275598
PCT Pub. Date: Jan. 5, 2023

(65) Prior Publication Data
US 2024/0289209 A1    Aug. 29, 2024

(51) Int. Cl.
*G06N 3/088* (2023.01)
*G06F 11/08* (2006.01)

(52) U.S. Cl.
CPC ............ *G06N 3/088* (2013.01); *G06F 11/08* (2013.01)

(58) Field of Classification Search
CPC . H04L 63/1425; H04L 63/1433; G06N 3/088; G06N 20/00; G06F 11/08
See application file for complete search history.

(56) References Cited

U.S. PATENT DOCUMENTS

| | | |
|---|---|---|
| 10,574,512 B1 | 2/2020 | Mermoud et al. |
| 2022/0303288 A1* | 9/2022 | Wang ............. G06F 18/2113 |
| 2023/0018848 A1* | 1/2023 | Eline ............. G06N 3/088 |

FOREIGN PATENT DOCUMENTS

WO    2018/133924 A1    7/2018

OTHER PUBLICATIONS

Islam et al., Anomaly detection in a large-scale cloud platform, IEEE, pp. 150 to 159. (Year: 2021).*

(Continued)

*Primary Examiner* — Shelly A Chase
(74) *Attorney, Agent, or Firm* — Rothwell, Figg, Ernst & Manbeck, P.C.

(57) ABSTRACT

Embodiments described herein relate to a method and apparatus for detecting and explaining anomalies in data obtained from an environment using an encoder-decoder machine learning model. A state of the environment is represented by a plurality of features, and the machine learning model is trained with a first set of data samples. Each data sample in the first set of data samples comprises values for each of the plurality of features. The method comprises determining a respective first threshold for each of the plurality of features based on respective maximum reconstruction errors for each feature found during training of the encoder-decoder machine learning model; obtaining an anomalous data sample; determining respective reconstruction errors for each feature in the anomalous data sample using the trained encoder-decoder machine learning model; and determining one or more features in the anomalous data sample that are responsible for the anomalous data sample being anomalous responsive to the reconstruction errors associated with the one or more features being greater than or equal to the respective first thresholds.

20 Claims, 10 Drawing Sheets

(56) References Cited

OTHER PUBLICATIONS

International Search Report and Written Opinion issued in International Application No. PCT/IB2021/055868 dated Mar. 29, 2022 (15 pages).
Dai, L. et al., "SDFVAE: Static and Dynamic Factorized VAE for Anomaly Detection of Multivariate CDN KPIs", Proceedings of the 7th ACM Conference on Information-Centric Networking, ACMPUB27, Apr. 19, 2021 (11 pages).
Khan, S. et al., "Robustness of AI-based prognostic and systems health management", Annual Reviews in Control, vol. 51, Jan. 1, 2021 (23 pages).
Li, J. et al., "Cognitive visual anomaly detection with constrained latent representations for industrial inspection robot", Applied Soft Computing Journal, vol. 95, Jul. 16, 2020 (11 pages).
Hale, J., "Scale, Standardize, or Normalize with Scikit-Learn", Mar. 14, 2019 (14 pages).
Su, Y. et al., "Robust Anomaly Detection for Multivariate Time Series through Stochastic Recurrent Neural Network", Applied Data Science Track Paper, KDD '19 Aug. 4-8, 2019 (10 pages).
Provotar, O. I. et al., "Unsupervised Anomaly Detection in Time Series Using LSTM-Based Autoencoders", IEEE, Jun. 6, 2021 (5 pages).
Malhotra, P. et al., "LSTM-based Encoder-Decoder for Multi-sensor Anomaly Detection", Jul. 11, 2016 (5 pages).
"What is Kubernetes?", Jul. 23, 2021 (4 pages).

\* cited by examiner

METHOD AND APPARATUS FOR DETECTING AND EXPLAINING ANOMALIES

CROSS REFERENCE TO RELATED APPLICATIONS

This application is a 35 U.S.C. § 371 National Stage of International Patent Application No. PCT/IB2021/055868, filed 2021 Jun. 30.

TECHNICAL FIELD

Embodiments described herein relate to a method and apparatus for detecting and explaining anomalies in data obtained from an environment.

BACKGROUND

Information Technology (IT) service outages are rare events, but when they do occur, they tend to cost an organization dearly. A Gartner report estimates the average cost of an IT outage to be around $5000 per minute, with a third of organizations losing upwards of $1 million an hour. The effect of faults on cloud platforms (or systems) is often highly pronounced as the outage generally affects several users at the same time in private cloud settings or worse, several organizations at the same time for the public cloud settings.

A crucial component to any automated fault detection solution for cloud environments is a so-called explainable anomaly detection (AD) system whereby an automated system monitors key performance metrics from the cloud platform and identifies whenever the cloud system is expected to be in an anomalous state. The system makes a determination as to this state of the system by using several metrics that are collected from several components of the cloud platform. One key requirement is that, in addition to simpler anomalies that could be identified by considering only individual monitored metrics, the anomaly detection system should also be able to identify more complex anomalies, such as those that involve complex relationship among several of the metrics at the same time. Another key requirement may be that the solution should, in addition to identifying that an anomaly that occurred, also give an explanation as to why that particular sample of metrics is labeled as anomalous.

Anomaly detection solutions can be grouped into one-dimensional solutions and multi-dimensional solutions. One-dimensional solutions attempt to capture anomalies by only considering a single metric at a time. For such solutions, explaining why a value or a set of values of a metric are anomalies is generally simple and follows directly from the anomaly detection solution used. Multi-dimensional solutions attempt to identify anomalies that occur by considering one or more metrics at the same time. For a system with several metrics (such as a cloud platform), a naïve solution is to use several parallel one-dimensional solutions (i.e., one for each metric) at the same time. However, this approach is very slow, resource consuming and is not able to capture more complex anomalies that need to be explained in terms of the relationship between several metrics at the same time. Furthermore, when working in today's IT environment where several thousand metrics can be collected at the same time, providing a one-dimensional solution for each metric at a time is not scalable and many anomalies that relate to several metrics at a time will remain undetected.

There are several multi-dimensional solutions for anomaly detection in the literature that lack expandability.

For example, Su, Y., et al. (2019, July) "*Robust anomaly detection for multivariate time series through stochastic recurrent neural network*" in Proc. ACM SIGKDD International Conference on Knowledge Discovery & Data Mining (pp. 2828-2837) introduced anomaly detection for a multivariate time series dataset using a recurrent neural network (RNN) and a variational autoencoder (VAE). The proposed method consists of five main modules: (1) pre-processing, (2) model training, (3) threshold selection, (4) online detection and (5) anomaly results. In the pre-processing module, the dataset is transformed by data standardization, and then it is segmented into sequences through sliding windows. Next, a normal training multivariate time series is sent to the model training module to learn a model that captures the normal patterns of multivariate time series. In the threshold selection step, an anomaly threshold is calculated automatically using the Peaks-Over-Threshold (POT) method. After receiving the online data in step 4, anomalies are detected using the output of step 1 and 4 in the anomaly results step. Also, the RNN, Long Short-Term Memory (LSTM) and Gated Recurrent Units (GRU), are adapted with the VAE to capture the temporal relation of sensor values in time-series dataset. However, this solution, and others like it, do not provide explanations of detected anomalies.

SUMMARY

According to some embodiments there is provided a method of detecting and explaining anomalies in data obtained from an environment using an encoder-decoder machine learning model, wherein a state of the environment is represented by a plurality of features, and wherein the encoder-decoder machine learning model is trained with a first set of data samples, and each data sample in the first set of data samples comprises values for each of the plurality of features. The method comprises determining a respective first threshold for each of the plurality of features based on respective maximum reconstruction errors for each feature found during training of the encoder-decoder machine learning model; obtaining an anomalous data sample; determining respective reconstruction errors for each feature in the anomalous data sample using the trained encoder-decoder machine learning model; and determining one or more features in the anomalous data sample that are responsible for the anomalous data sample being anomalous responsive to the reconstruction errors associated with the one or more features being greater than or equal to the respective first thresholds.

According to some embodiments there is provided an apparatus for detecting and explaining anomalies in data obtained from an environment using an encoder-decoder machine learning model, wherein a state of the environment is represented by a plurality of features, and wherein the machine learning model is trained with a first set of data samples, and each data sample in the first set of data samples comprises values for each of the plurality of features. The apparatus comprises processing circuitry configured to cause the apparatus to perform the method as described above.

According to some embodiments there is provided a computer program comprising instructions which, when executed on at least one processor, cause the at least one processor to carry out a method as described above.

According to some embodiments there is provided a computer program product comprising non transitory computer readable media having stored thereon a computer program as described above.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

Figure 1:
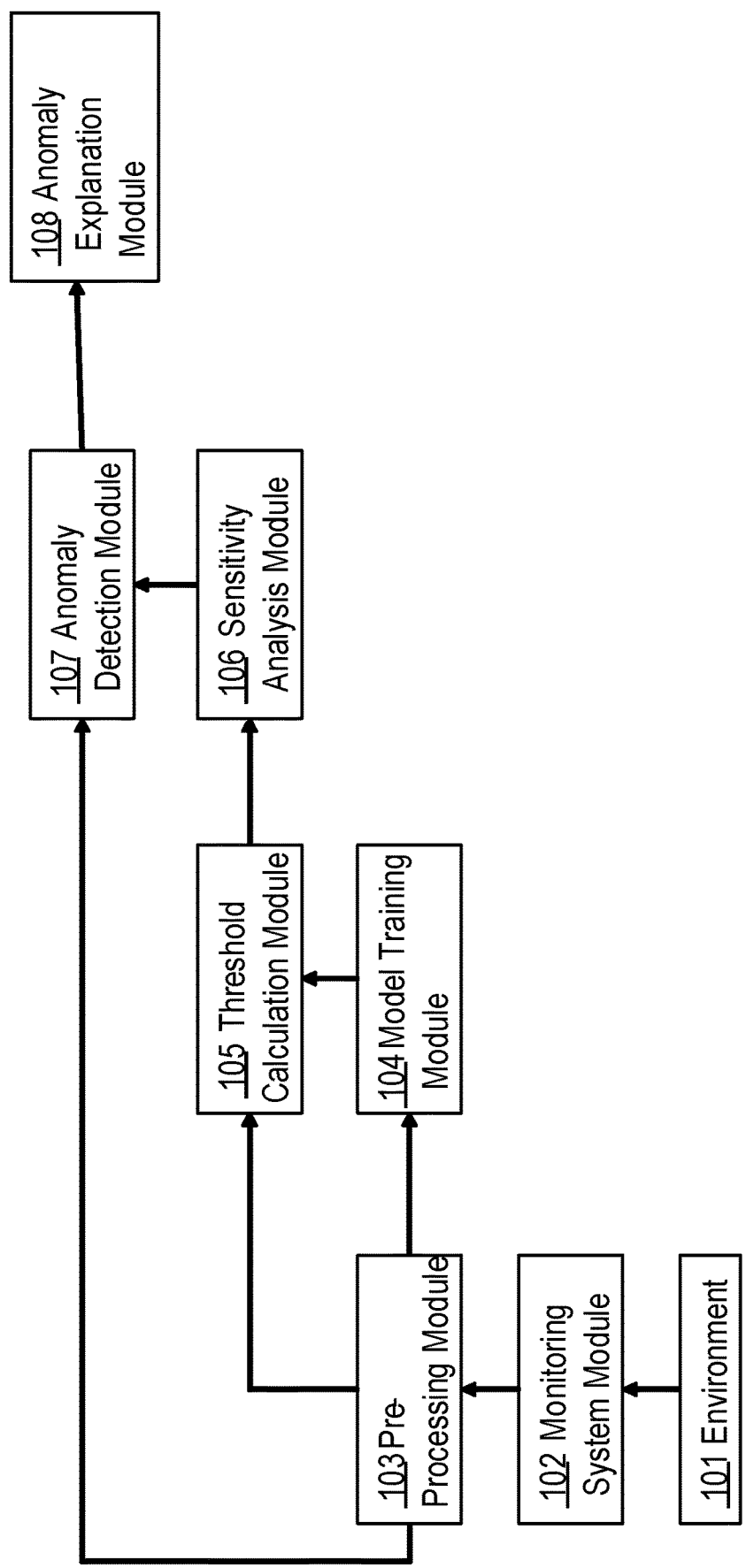
FIG. 1 illustrates an example overview of some embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Detecting anomalies of an individual feature by considering, say a normal range, is simple. A challenge arises when the changes in values of the individual values is within the normal range, but the combination of values is unexpected. For example, one would expect Central Processing Unit (CPU) utilization and network Input/Output (IO) to be correlated. In other words, if the CPU utilization is high, then the network IO should also be high and vice versa. The ranges of the high and low may be dependent on the load on that server. However, what would not be expected, and should be flagged as anomalous, is a sample in which the CPU utilization is high and network IO is low. There are existing solutions (those presented in the background) for identifying such anomalies, but these solutions can only say 'this sample is anomalous' without having the capability to explain why for example, to infer that that the CPU utilization is too high and the network IO is too low.

Embodiments described herein provide methods and apparatuses for detecting anomalies that occur in an environment and providing an explanation for the anomalies. A monitoring system may be provided attached to the environment whereby a plurality of features that relate to the performance of the environment may be collected and stored. In some embodiments, historical values of a plurality of features are used to train a multivariate explainable anomaly detection model. Once the model is trained, it can be used to evaluate, in real-time, the plurality of features for anomalies. If an anomalous sample is detected, methods provided herein may then proceed to produce an explanation as to what caused this anomaly, for example, in terms of which features caused of the anomaly, and in some embodiments what change in those features (e.g. what noise signal) led to the anomaly.

FIG. 1 illustrates an example overview of some embodiments described herein. Embodiments described herein may be implemented by one or more of the following functional components: an environment (e.g. a cloud system) 101, a monitoring system module 102, a pre-processing module 103, a model training module 104, a threshold calculation module 105, a sensitivity analysis module 106, an anomaly detection module 107, and an anomaly explanation module 108. The monitoring system module 102 monitors the environment 101 for anomalies. In embodiments described herein, a cloud platform is described as an example environment. It will however be appreciated that the embodiments described herein may be applied to any environment from which the values of features can be collected and whereby those features represent the state of the environment. The monitoring system module 102 collects the values of several features from the environment 101. For example, the monitoring system module 102 may collect a data sample from the environment 101 at a particular time instance, wherein the data sample comprises values for each of a plurality of features In some examples, the monitoring system module 102 exposes both the historical data samples as well as the live data samples being collected from the environment 101.

Figure 2:
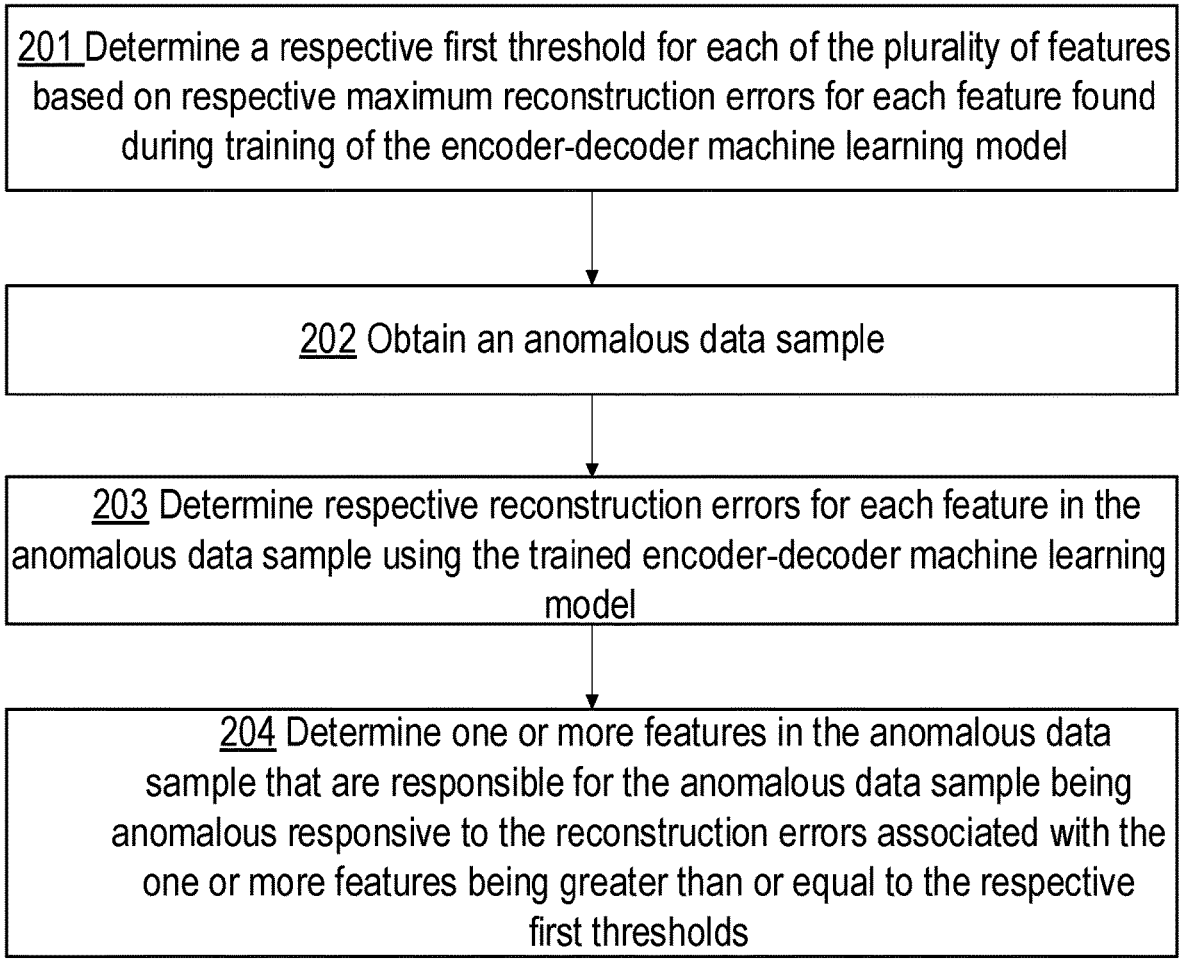
FIG. 2 illustrates a method of detecting and explaining anomalies in data obtained from an environment using an encoder-decoder machine learning model.

FIG. 2 illustrates a method of detecting and explaining anomalies in data obtained from an environment using an encoder-decoder machine learning model, wherein a state of the environment is represented by a plurality of features, and wherein the encoder-decoder machine learning model is trained with a first set of data samples, and each data sample in the first set of data samples comprises values for each of the plurality of features. The method of FIG. 2 may be performed by one or more of the pre-processing module 103, the model training module 104, the threshold calculation module 105, the sensitivity analysis module 106, the anomaly detection module 107, and the anomaly explanation module 108 as illustrated in FIG. 1.

The training of the encoder-decoder machine learning model will be described in more detail with reference to FIG. 4, and how the first set of data samples may be obtained is described in more detail with reference to FIG. 3.

In step 201, the method comprises determining a respective first threshold for each of the plurality of features based on respective maximum reconstruction errors for each feature found during training of the encoder-decoder machine learning model. For example, the first threshold for a particular feature may be equal to the maximum reconstruction error for that feature. However, it will be appreciated that in some examples, the first threshold may be set to a value of, for example, >$95^{th}$ percentile of the maximum reconstruction error for that feature.

In some examples, the respective first threshold for each of the plurality of features is set to the Nth percentile of the maximum reconstruction error for the respective feature responsive to the first set of data samples comprising (100−N) % anomalies, where N is an numerical value. It will be appreciated (as will be described further later with reference to FIG. 3) that the first set of data samples may be designed such that it contains no, or a very low percentage of anomalies. In other words, the first set of data samples may be configured such that the encoder-decoder machine learning model is trained based on largely non-anomalous data. In other words, during training of the encoder-decoder machine learning model, the first set of data samples may be assumed to contain no anomalies.

In some examples step 201 is performed by the threshold calculation module 105 as illustrated in FIG. 1.

In step 202, the method comprises obtaining an anomalous data sample. For example, as illustrated in FIG. 1 the anomaly detection module 107 receives the live data samples output by the pre-processing module 103. The live data samples may in some circumstances comprise an anomalous data sample.

In step 203, the method comprises determining respective reconstruction errors for each feature in the anomalous data sample using the trained encoder-decoder machine learning model. For example, the anomaly detection module 107 may be configured to input the live data samples into the trained encoder-decoder machine learning model. The reconstruction errors for each feature in the live data samples may then be determined.

In step 204 the method comprises determining one or more features in the anomalous data sample that are responsible for the anomalous data sample being anomalous responsive to the reconstruction errors associated with the one or more features being greater than or equal to the respective first thresholds. For example, the anomaly detection module 107 may be configured to compare the reconstruction errors for each feature in each live data sample to the respective feature thresholds. Based (in some examples, partly) on this comparison, the anomaly detection module may determine whether any of the live data samples are anomalous data samples (as will be described in more detail with reference to FIG. 6. In some examples, the anomaly detection module 107 may also utilize an average sample reconstruction error to determine whether a sample is anomalous.

If an anomalous data sample is detected by the anomaly detection module 107, the anomaly detection module 107 may output the anomalous sample to the anomaly explanation module 108. The anomaly explanation module 108 may then determine the one or more features in the anomalous data sample that are responsible for the anomalous data sample being anomalous by comparing the reconstruction errors associated with the features in the anomalous data sample to the respective first thresholds.

Figure 3:
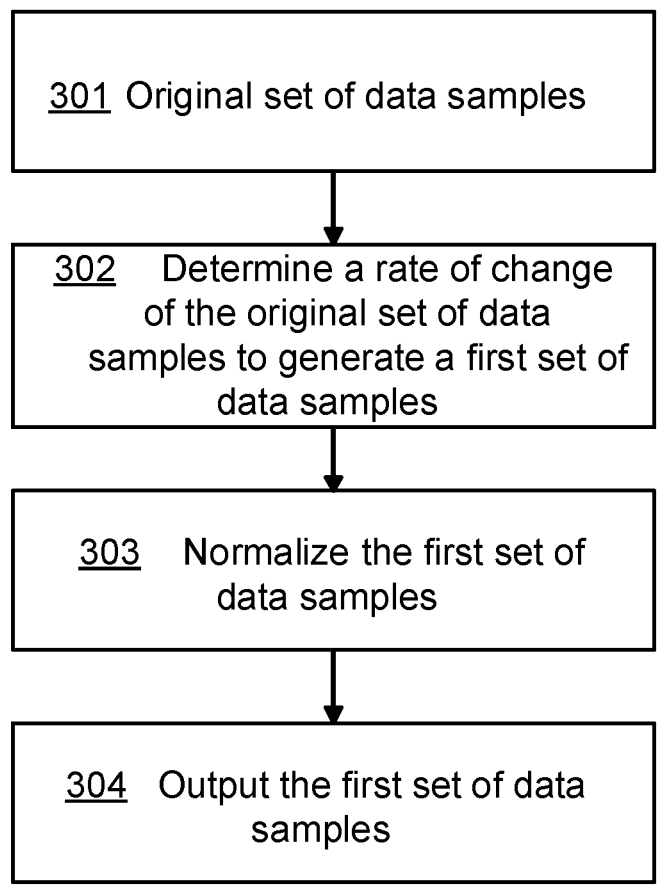
FIG. 3 illustrates an example of how the first set of data samples may be obtained.

FIG. 3 illustrates an example of how the first set of data samples may be obtained. The method of FIG. 3 may be performed by the monitoring system module 102 and the pre-processing module 103 as illustrated in FIG. 1.

In step 301, the method comprises obtaining an original set of data samples. For example, the monitoring system module 102 may obtain the original set of data samples from the environment 101. For example, the environment may comprise a cloud platform. Specifically, the environment may comprise a Kubernetes (K8S) cloud platform that is hosting a few applications. The monitoring system module 102 may utilize Prometheus as a monitoring system. K8S exposes several thousand features (or metrics) for monitoring and hence it will be appreciated that embodiments described herein may deal with any number of features. In some examples, the monitoring system module 102 may periodically (e.g., every 10 s) sample the values of the features from the environment 101. For simplicity, we assume that K8S exposes only the following 6 features: [cpu_utilization_server_1, memory_utilization_server_1, network_io_server_1, cpu_utilization_server_2, memory_utilization_server_2, network_io_server_2].

Each original sample obtained by the monitoring system module 102 may therefore include values for each of these 6 features. Five examples of samples that are collected from real world server are given as:

$I_1$=[0.45, 4.33G, 97.3M, 0.35, 2.9G, 66.2M]
$I_2$=[0.59, 6.12G, 100.4M, 0.46, 12.9G, 77.2M]
$I_3$=[0.70, 7.09G, 120.6M, 0.65, 3.9G, 89.2M]
$I_4$=[0.88, 10.21G, 150.4M, 0.85, 2.9G, 99.2M]
$I_5$=[0.91, 15.21G, 182.3M, 0.95, 6.9G, 120.2M]

It will be appreciated that each value in a sample represents a different feature. In particular, the order of the values in the sample may be the same as the order of the example features listed above.

In steps 302 or 303 the method comprises pre-processing the original set of data samples. Steps 302 and 303 may be performed by the pre-processing module 103 to prepare the raw original set of data samples to make it suitable for building and training machine learning models.

For example, in step 302, the method may comprise determining a rate of change of the original set of data samples collected by the monitoring system module 102 to generate the first set of data samples. This may ensure that the data is stationary. For example, if the feature is a counter of the number of bytes sent over a network interface, then normally that number would always increase. By determining the rate of change it is ensured that the feature both increases and decreases to represent how the feature is changing over time.

For example, in step 302 the method may comprise utilizing a differentiation function which can calculate the difference of consecutive values of a given feature. This function should able to calculate the $n^{th}$ order discrete difference along the given axis. This may compensate for how Prometheus may increase feature values over time. An example of this case can be seen in feature values of $I_1$ to $I_5$. As we can see, the feature value of newtork_io_server 2 (the last feature listed in each data sample) increases over the time. However, by applying a $1^{st}$ order discrete difference, the feature values of $I_1$ to $I_5$ would be reduced to:

$I'_1$=[0.140, 1.79G, 3.10M, 0.110, 10G, 11.0M]
$I'_2$=[0.110, 0.970G, 20.20M, 0.190, 9G, 12.0M]
$I'_3$=[0.180, 3.12G, 29.80M, 0.200, 1G, 10M]
$I'_4$=[0.030, 5G, 31.90M, 0.100, 4G, 21.10M]

Optionally, differentiation function may be applied several times to a feature, depending on the characteristics of the feature.

Furthermore, the values of the features in the first set of data samples may also be normalised in step 303. For example, the values of the features in the first set of data samples may be converted to the range [0,1] with the aim of converting the feature values in the first set of data samples into a common scale without distorting their relative values. The importance of normalization lies in the fact that feature values that are measured at different scales may not contribute equally to the analysis and may end up creating a bias in the analysis. For example, in sample $I'_1$, the feature value of 10G may outweigh any feature that ranges between 0 and 1. Transforming the data to comparable scales can prevent such problem. It will be appreciated that there are several methods for normalization that may be used, for example the normalization function which. is given by Eq. (1). In this function, the minimum value is subtracted from the feature value and then divided by the range. The range is the difference between the original maximum and original minimum values. In doing so, the function normalizes the data values while preserving the original distribution.

$$\frac{x - \min}{\max - \min} \quad (1)$$

where x is the value of the given feature.

For example, after normalization, the samples of $I'_1$ to $I'_4$ will become:
$I''_1$=[0.733, 0.203, 0, 0.1, 1, 0.090]
$I''_2$=[0.533, 0, 0.593, 0.9, 0, 0.181]
$I''_3$=[1, 0.533, 0.927, 1, 0.421, 0]
$I''_4$=[0, 1, 1, 0, 0.684, 1]

In step 304, the method may then comprise outputting the first set of data samples.

Figure 4:
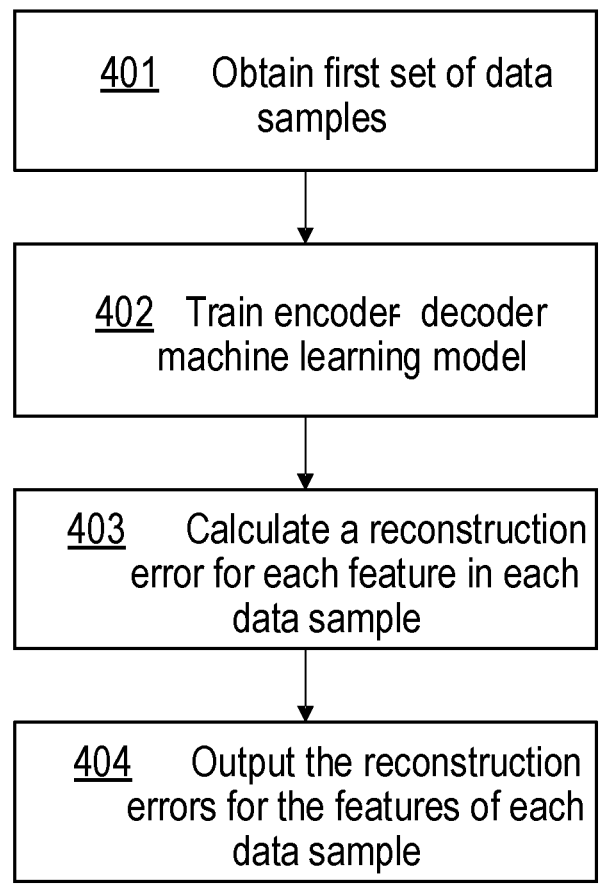
FIG. 4 illustrates an example of a method for training the encoder-decoder machine learning model.

FIG. 4 illustrates an example of a method for training the encoder-decoder machine learning model. It will be appreciated that the encoder-decoder machine learning model may be implemented as an autoencoder. In other examples, the encoder-decoder machine learning model may be implemented using, for example, principal component analysis. It will be appreciated that any machine learning model of an encoder-decoder type may be used.

The method of FIG. 4 may be performed by the model training module 104 as illustrated in FIG. 4.

In step 401, the method comprises obtaining the first set of data samples. For example, the model training module 104 may receive the pre-processed data samples from the pre-processing module 103. In particular, the model training module 104 may receive the first set of data samples, for example as determined by the method in FIG. 3.

In step 402, the method comprises training the encoder-decoder machine learning model using the first set of data samples. In some examples, the first set of data samples comprises both anomalous and non-anomalous data samples. It will however be appreciated that the intention of training the encoder-decoder machine learning model is to train the model to reproduce non-anomalous data samples. The percentage of data samples that are anomalous in the first set of data samples may therefore be a design choice. In some examples, anomalous data samples may be used to test the encoder-decoder machine learning model once it has been trained.

In some examples, the encoder-decoder machine learning model comprises an autoencoder. An autoencoder is a type of artificial neural network used to learn the data in an unsupervised manner. An autoencoder consists of two modules: an encoder and a decoder. The encoder receives the original data as an input and transforms it into a compact version, whereas the decoder reconstructs the original data from the compact version. The autoencoder is trained with the main objective of minimizing the difference between the original data and reconstructed data. An autoencoder may therefore reconstruct normal data with small errors, whilst the reconstruction error for anomalous data is usually much larger.

In step 403, a reconstruction error for each feature in each data sample is calculated. The reconstruction error for a feature may be calculated as the absolute value of the difference between the input value of the feature into the encoder-decoder machine learning model and the output value of the feature from the encoder-decoder machine learning model.

In this example, it is assumed that $I''_1$ to $I''_4$ contain no anomalies. After training the model, the autoencoder predicts the outputs of $O_1$ to $O_4$ for $I''_1$ and $I''_4$, respectively, as follows:

$O_1$=[0.821, 0.205, 0.0004, 0.1, 0.97, 0.090]
$O_2$=[0.533, 0.004, 0.593, 0.89, 0.0002, 0.181]
$O_3$=[0.98, 0.536, 0.927, 0.955, 0.421, 0.0008]
$O_4$=[0.0001, 0.988, 0.989, 0.0007, 0.684, 0.979]

The reconstruction errors $E_1$ to $E_4$ for $I''_1$ to $I''_4$ may then be calculated as:

$E_1$=[0.087, 0.0019, 0.0004, 0.0, 0.030, 0.0]
$E_2$=[0.0, 0.004, 0.0, 0.010, 0.0002, 0.0]
$E_3$=[0.020, 0.003, 0.0, 0.045, 0.0, 0.0008]
$E_4$=[0.0001, 0.0120, 0.0110, 0.0007, 0.0, 0.0210]

As we can see, the reconstruction errors for the features are all small (e.g. close to zero, e.g. less than $10^{-3}$), which is an indication of the fact that that $I''_1$ to $I''_4$ are non-anomalous data samples.

In some examples, step 403 may further comprise calculating average sample reconstruction errors for each data sample. The average sample reconstruction error may be calculated as an average of reconstruction errors for the features in a sample. For example, the average sample reconstruction errors $S_1$ to $S_4$ for samples $I''_1$ to $I''_4$ are:

$S_1$=0.010
$S_2$=0.0009
$S_3$=0.0200; and
$S_4$=0.007.

In step 404, the method may comprise outputting the reconstruction errors for the features of each data sample. In some examples, step 404 further comprises outputting the average sample reconstruction errors.

Figure 5:
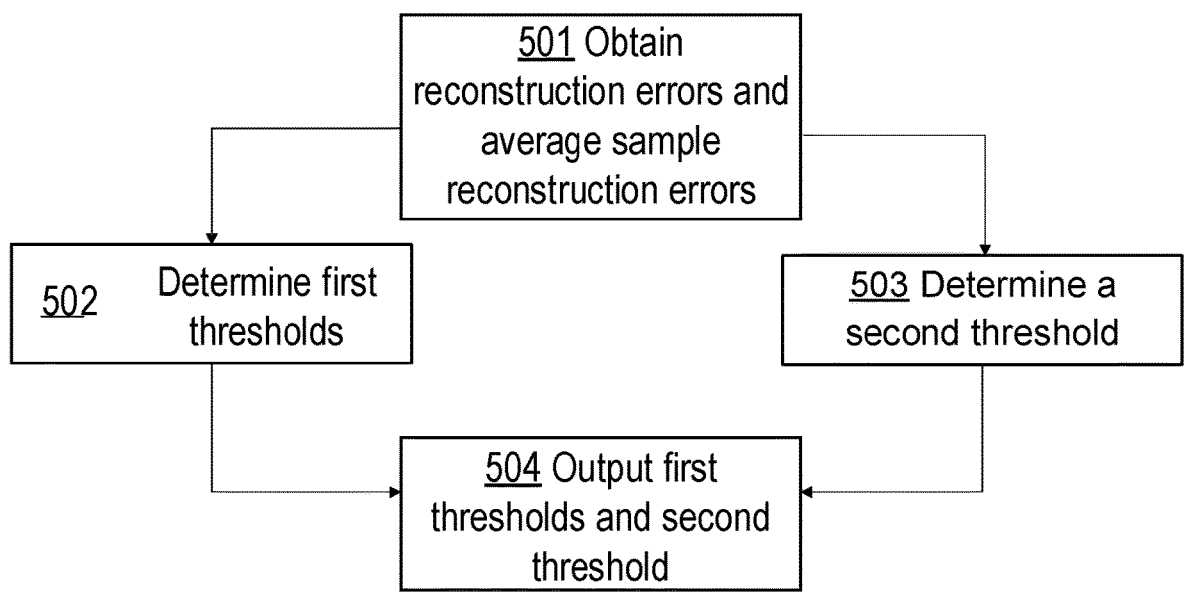
FIG. 5 illustrates an example method for determining the first threshold.

FIG. 5 illustrates an example method for determining the first threshold. In some examples, the method of FIG. 5 may be performed by the threshold calculation module 105 as illustrated in FIG. 1.

In step 501 the method comprises obtaining the reconstruction errors (e.g. $E_1$ to $E_4$) for the features of each data sample. These may be calculated as described with reference to FIG. 4. Step 501 may further comprise obtaining the average sample reconstruction errors (e.g. $S_1$ to $S_4$) for the samples in the first set of data samples.

In step 502 the method comprises determining a first threshold for each of the plurality of features based on respective maximum reconstruction errors for each feature. Step 502 may correspond to step 201 of FIG. 2.

In this example, the first threshold $T_1$ for each feature is set as equal to the maximum reconstruction error for the feature.

For example, by considering $E_1$ to $E_4$, the first thresholds would be as follows:

$T_1$=[0.087, 0.004, 0.0110, 0.045, 0.03, 0.021].

In step 503, the method comprises determining a second threshold $T_2$ based on a maximum average sample reconstruction error for the first set of data samples found during the training step.

For example, given the average sample reconstruction errors $S_1$ to $S_4$ as calculated above, the second threshold $T_2$ may be set as 0.020.

In step 504, the method comprises outputting the first thresholds for the respective features. In some examples, step 504 further comprises outputting the second threshold.

Figure 6:
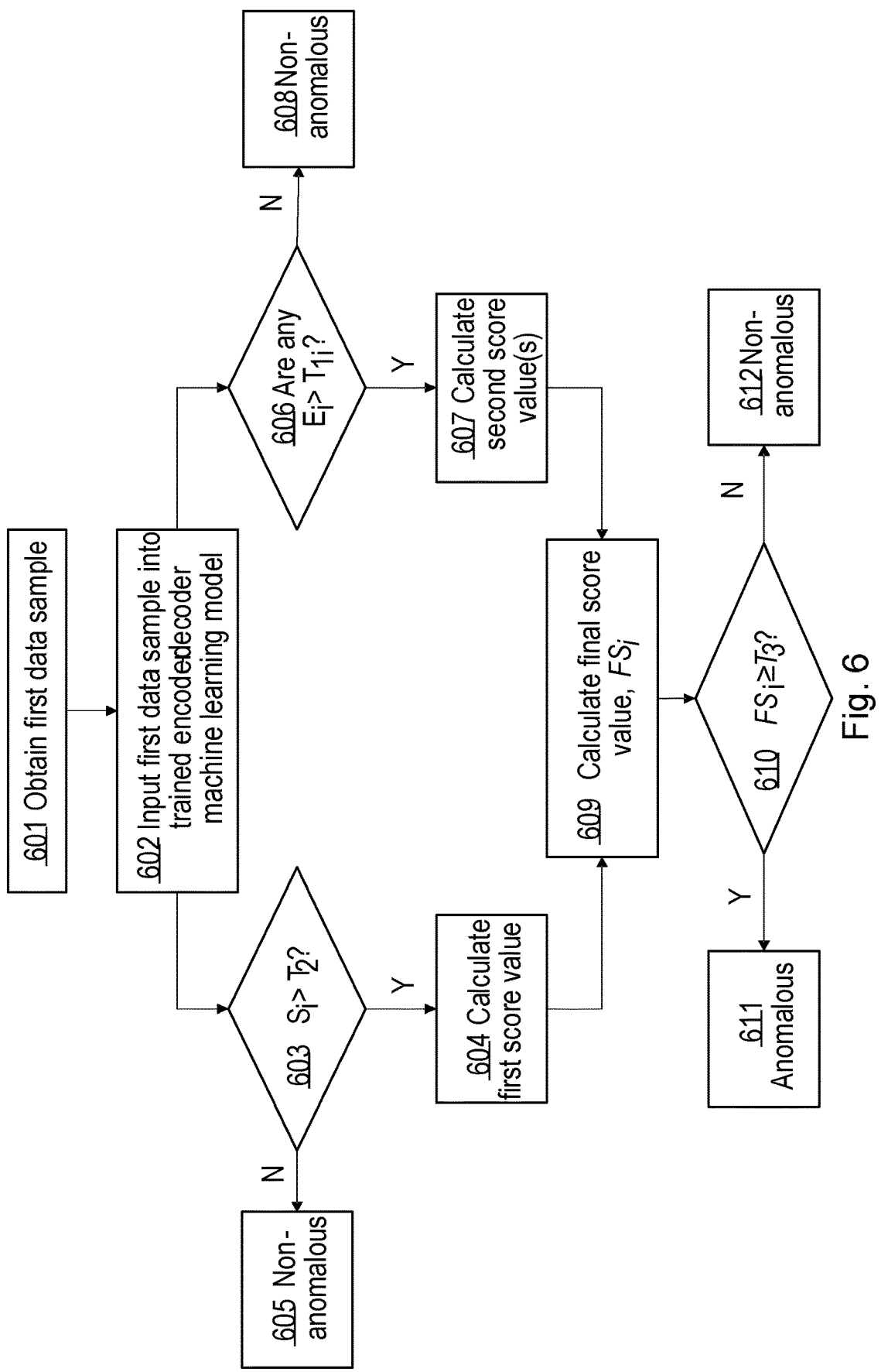
FIG. 6 illustrates an example of a method for obtaining an anomalous data sample.

FIG. 6 illustrates an example of a method for obtaining an anomalous data sample. FIG. 6 may therefore illustrate an example implementation of step 202 of FIG. 2. The method of FIG. 6 may be performed by the anomaly detection module 107 as illustrated in FIG. 1.

In step 601, the method comprises obtaining a first data sample in a second set of data samples. The second set of data samples may comprise the live data being received from the environment 101.

In step 602, the method comprises inputting the first data sample into the trained encoder-decoder machine learning model to determine a first average sample reconstruction error for the first data sample.

For example, consider two data samples in the second set of data samples, $I_6$ and $I_7$. It may be assumed that the second set of data samples have been pre-processed appropriately (e.g. similarly to the first set of data samples).

$I_6$=[0.933, 0.903, 0.5, 0.1, 1, 0.090]
$I_7$=[0.9, 1, 1, 0, 0.684, 1]

In step 602, the encoder-decoder machine learning model predicts outputs $O_6$ and Or as follows:

$O_6$=[0.721, 0.205, 0.2, 0.1, 0.97, 0.090]
$O_7$=[0.2, 0.988, 0.989, 0.0007, 0.684, 0.979]

In step 603, the method comprises comparing the first average sample reconstruction error to the second threshold.

To do this, the method may first calculate the reconstruction errors for all features in the samples.

For example, the reconstruction errors $E_6$ and $E_r$ for $O_6$ and $O_7$ are as follows:

$E_6$=[0.212, 0.698, 0.3, 0.1, 0.030, 0.0]
$E_7$=[0.7, 0.0120, 0.0110, 0.0007, 0.0, 0.0210].

The average sample reconstruction errors $S_6$ and $S_r$ are therefore calculated as:

$S_6$=(0.212+0.698+0.3+0.1+0.030+0.0)/6=0.223
$S_7$=(0.7+0.0120+0.0110+0.0007+0.0+0.0210)/6=0.124

In step 603 responsive to the first average sample reconstruction error being greater than the second threshold, the method comprises setting the first data sample as an anomalous data sample. In this case, the method will pass to step 604. In the example given above, the average sample reconstruction error of both samples goes beyond the second threshold value of 0.020. Thus, in this example, both samples $I_6$ and $I_7$ are considered anomalous.

If in step 603, it is determined that the first average sample reconstruction error is less than or equal to the second threshold, the method would pass to step 605 in which the first data sample is set as a normal (or non-anomalous) data sample.

In step 604 the method comprises calculating a first score value as the difference between the first average sample reconstruction error and the second threshold. In other words, a first score value may be calculated for each anomalous data sample.

For the specific example, the first scores $AS_6$ and $AS_7$ for the samples $I_6$ and $I_7$ may be calculated as:

$AS_6$=(0.223–0.020)=0.203
$AS_7$=(0.124–0.020)=0.104

In step 606 the method comprises comparing each reconstruction error to the respective first thresholds for each feature.

As previously mentioned, the reconstruction errors $E_6$ and $E_7$ for $I_6$ and $I_7$ are as follows:

$E_6$=[0.212, 0.698, 0.3, 0.1, 0.030, 0.0]
$E_7$=[0.7, 0.0120, 0.0110, 0.0007, 0.0, 0.0210].

The first thresholds are:
$T_1$=[0.087, 0.004, 0.0110, 0.045, 0.03, 0.021].

Therefore, for $I_6$ the first, second, third and fourth features are all associated with reconstruction errors that are greater than the respective first threshold.

For $I_7$ the first and second features are both associated with reconstruction errors that are greater than the respective first thresholds.

Responsive to at least one of the reconstruction errors being greater than the respective first threshold, the method comprises setting the first data sample as an anomalous data sample. In this case, the method passes to step 607. In this example both $I_6$ and $I_7$ are set as anomalous data samples.

If all of the reconstruction errors are less than or equal to the respective first thresholds, the method passes to step 608 in which the fist data sample is set as a normal (or non-anomalous) data sample.

In step 607, the method comprises calculating second score values for each feature as the difference between the reconstruction errors and the respective first thresholds.

For example, the second score values $BS_6$ and $BS_7$ for $I_6$ and $I_7$ are:

$$BS_6 = [(0.212 - 0.087) = 0.125, (0.698 - 0.004) = 0.694,$$
$$(0.3 - 0.0110) = 0.289, (0.1 - 0.045) = 0.55,$$
$$(0.030 - 0.030) = 0.0, (0 - 0.021) = -0.021]; \text{and}$$

-continued $BS_7 = [(0.7 - 0.087) = 0.613, (0.012 - 0.004) = 0.008,$ $(0.0110 - 0.0110) = 0, (0.0007 - 0.045) = -0.0443,$ $(0.0 - 0.03) = -0.03, (0.0210 - 0.0210) = 0.0]$ In step 609 the method comprises calculating a final score value for the first data sample as a sum of the first score value and each of the second score values.

In this example the final score values $FS_6$ and $FS_7$ for $I_6$ and $I_7$ are:

$$FS_6 = (0.125 + 0.694 + 0.289 + 0.55 + 0 - 0.021 + 0.203) = 1.84$$

$$FS_7 = (0.613 + 0.008 + 0 - 0.0443 - 0.03 + 0) = 0.5467$$

In step 610, the method comprises comparing the final sample score to a third threshold. The third threshold may be set as the sum of the second threshold and a minimum of the first thresholds for the sample.

In this example, the third threshold $T_3$ may therefore be:

$$T_3 = 0.020 + \min(0.087, 0.004, 0.0110, 0.045, 0.03, 0.021) =$$

$$0.020 + 0.004 = 0.024$$

Responsive to the final score value being greater than or equal to the third threshold, the method comprises setting the first data sample as anomalous in step 611.

Responsive to the final score value being less than the third threshold, the method comprises setting the data sample as non-anomalous in step 612.

In this example therefore both samples are set as anomalous as both $FS_6$ and $FS_7$ are greater than 0.024.

Figure 7:
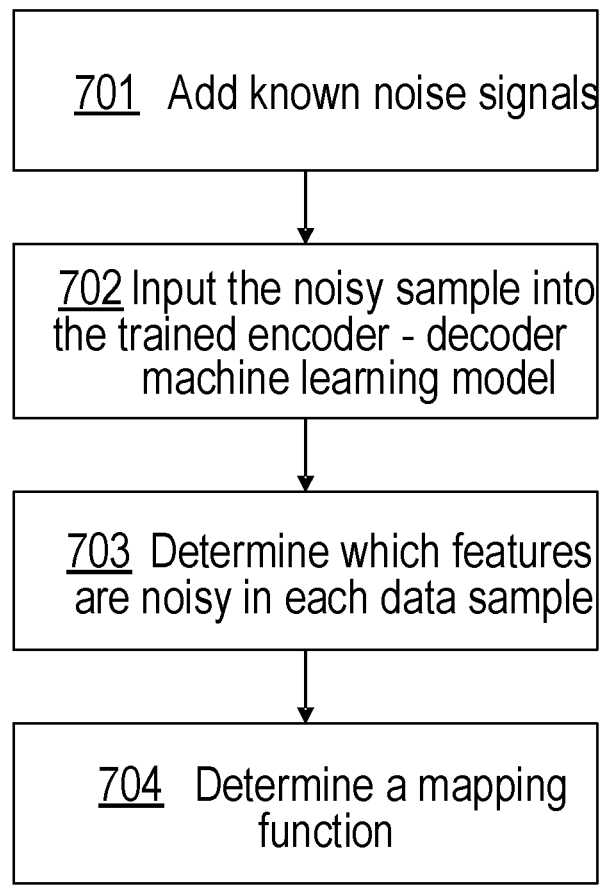
FIG. 7 illustrates an example method for training a sensitivity analysis model, wherein the sensitivity analysis model comprises a mapping function.

FIG. 7 illustrates an example method for training a sensitivity analysis model, wherein the sensitivity analysis model comprises a mapping function. The mapping function may be for use in determining a noise level causing an anomalous feature in a data sample.

The method of FIG. 7 may be used to determine what noise levels are affecting features that are anomalous. For example, given a sample, the mapping function may allow for the determination of by how much the value of a feature has deviated from an expected value, considering the other features in that sample. This, as a result, may help develop an explainable model as to what is causing the anomalies.

The method of FIG. 7 may be performed by the sensitivity analysis module 106 as illustrated in FIG. 1.

In step 701, the method comprises adding respective known noise signals to one or more samples in the first set of data samples to generate a noisy set of data samples.

For example, noise signals (e.g. having different magnitudes) of $\{0.1, 0.2, 0.3, 0.4, 0.5, 0.6, 0.7, 0.8, 0.9\}$ may be injected into different features in different samples within the first set of data samples to generate the noisy set of data samples.

For example, for the first data sample $I''_1$, where $I''_1=[0.733, 0.203, 0, 0.1, 1, 0.090]$ A noise signal of 0.1 may be introduced into the first feature, resulting in the noisy data sample, $N_1$, of:

$N_1=[0.833, 0.203, 0, 0.1, 1, 0.090]$

For each noisy sample in the noisy set of data samples the method may then perform steps 702 and 703.

In step 702, the method comprises inputting the noisy sample into the trained encoder-decoder machine learning model to determine reconstruction errors for each feature in the noisy sample.

For example, the encoder-decoder machine learning model may take the input of $N_1$ and may output $N'_1$ as follows:

$N'_1=[0.743, 0.205, 0.0004, 0.1, 0.97, 0.090]$.

The reconstruction errors for each feature in the noisy sample may then be calculated as:

$E_1=[0.09, 0.002, 0.0004, 0.0, 0.030, 0.0]$

In step 703, the method comprises determining which one or more features in the noisy sample comprise noise signals by comparing the respective reconstruction errors for each feature to the respective first threshold.

Given the first thresholds $T_1$ of:

$T_1=[0.087, 0.004, 0.0110, 0.045, 0.03, 0.021]$, the method may therefore determine that the first feature in the noisy data sample $N'_1$ is a noisy feature as the reconstruction error for the first feature (0.09) is greater than the respective first threshold (0.087).

In step 704, the method comprises determining the mapping function such that the mapping function maps the reconstruction errors for features comprising a noise signal to the respective known noise signals added in step a).

For example, Table 1 illustrates the feature reconstruction error results (RE_F1 to RE_F6) with different noise levels. Also, this table presents that number of features (NF) are affected by noise.

| Noise level | RE-F1 | RE-F2 | RE-F3 | RE-F4 | RE-F5 | RE-F6 | NF |
|---|---|---|---|---|---|---|---|
| 0.1 | 0.09 | 0.005 | 0.018 | 0.049 | 0.041 | 0.028 | 0 |
| 0.2 | 0.120 | 0.006 | 0.028 | 0.058 | 0.054 | 0.034 | 1 |
| 0.3 | 0.257 | 0.007 | 0.032 | 0.066 | 0.060 | 0.045 | 2 |
| 0.4 | 0.378 | 0.007 | 0.045 | 0.074 | 0.0741 | 0.055 | 3 |
| 0.5 | 0.478 | 0.008 | 0.051 | 0.084 | 0.0871 | 0.064 | 3 |
| 0.6 | 0.598 | 0.009 | 0.061 | 0.096 | 0.094 | 0.074 | 4 |
| 0.7 | 0.684 | 0.01 | 0.070 | 0.120 | 0.121 | 0.087 | 5 |
| 0.8 | 0.774 | 0.02 | 0.087 | 0.214 | 0.221 | 0.099 | 6 |
| 0.9 | 0.800 | 0.03 | 0.099 | 0.341 | 0.361 | 0.103 | 6 |
| 1 | 0.901 | 0.04 | 0.100 | 0.541 | 0.451 | 0.210 | 6 |

In this table, for example, when noise of 0.1 is injected to the normal sample, it did not affect any of features, as level of noise is low.

By contrast, when noise of 0.9 is injected to the normal sample, it affects all 6 features because level of noise is high.

It can be deduced from Table 1, that, in this example, there is a linear correlation between the reconstruction error for a given feature, $E_i$, and two variables of the noise level (NL) and the number of feature in the sample affected by noise (NF).

A mapping function may be determined by using multiple linear regression to determine a correlation between the reconstruction errors for features comprising a noise signal and two variables, wherein the two variables comprise the known noise signals (NL) and the number of noisy features (NF) in each data sample in the noisy set of data samples.

The mapping function may be determined as follows:

$$NL_i = \beta_0 + (\beta_1 \times E_i) + (\beta_2 \times NF) \quad (2)$$

where i is index of feature, $E_i$ is the reconstruction error for the feature i and $NL_i$ is the noise level on the feature i, and NF is the number of features experiencing noise in a sample.

In this function, for the first feature, the values of $\beta_2$, $\beta_1$ and $\beta_0$ may be calculated from the values in the table as:

$\beta_2$=0.0692
$\beta_1$=0.357
$\beta_0$=−0.0035

A mapping function for the first feature in this example may therefore be expressed as:

$$E_1 = -0.0035 + 0.357 \times NL_i + 0.0692 \cdot NF_i$$

This mapping function is therefore able to estimate the noise level that is injected to the first feature (as will be explained later with reference to FIG. 8).

Figure 8:
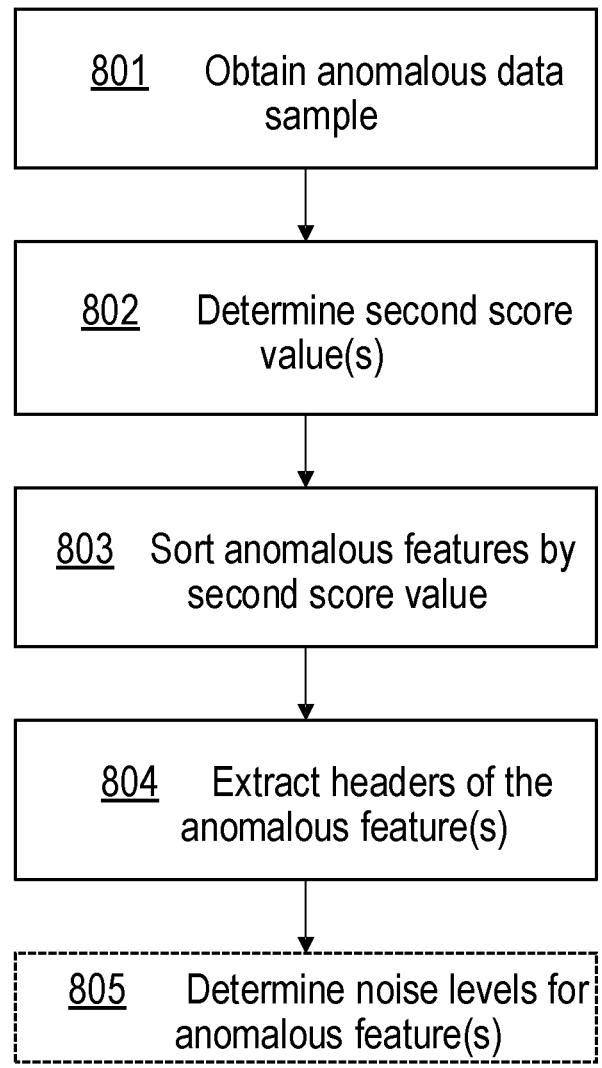
FIG. 8 illustrates an example method for providing further explanation of the cause of an anomalous data sample.

FIG. 8 illustrates an example method for providing further explanation of the cause of an anomalous data sample. The method of FIG. 8 may be performed by the anomaly explanation module 108 of FIG. 1.

In step 801, the method comprises obtaining an anomalous data sample (for example output from the anomaly detection module 107). The anomalous features may then be extracted from the anomalous data sample by comparing the reconstruction errors of the features to the respective first thresholds.

In step 802, the method comprises determining the second score value for each anomalous feature (for example as described with reference to FIG. 6).

For example, for the anomalous sample $I_6$, the first four features are anomalous (as previously described) and the second score values for the four anomalous features would be given as:

$BS_{61}$=0.125
$BS_{62}$=0.694
$BS_{63}$=0.289
$BS_{64}$=0.55

In step 803 the method comprises sorting the one or more features in the anomalous data sample that are responsible for the anomalous data sample being anomalous based on the second score values associated with each of the one or more features.

For example, the second score values for the four anomalous features from $I_6$ may be ordered as: $BS_{62}$, $BS_{64}$, $BS_{63}$, $BS_{61}$.

In step 804 the method comprises extracting the headers of the anomalous features and outputting the header in the order determined in step 803. For example, the header values of: [memory_utilization_server_1, cpu_utilization_server_2, network_io_server_1, cpu_utilization_server 1] may be extracted as an explanation of the anomaly.

The indication of the header values provides an indication of which features are responsible for the anomaly. The ordering of the features may provide an indication of which features are contributing more to the data sample being anomalous.

In some examples the method comprises step 805. In step 805, the method comprises for each of the one or more features that are responsible for the anomalous data sample being anomalous: determining a noise level associated with the feature by using the mapping function to map a reconstruction error for the feature to a noise level.

For example, the noise levels for the four anomalous features of $I_6$ may be estimates as:

$NL_1$=0.120
$NL_2$=0299
$NL_3$=0.600
$NL_4$=0.620

This noise level is indicative of what level of noise is occurring at the features to cause the anomaly. In some examples, the noise level may be converted back into a value representative of a real-world value by reversing the normalization applied to the feature values. This may then give an indication as to what may be occurring in the system to lead to such an anomaly.

The explanation module 108 is therefore able to, for a multi-variate sample, determine which features in the sample are causing the sample to be anomalous.

For example, consider a sample x consisting of the 6 features as exemplified in the examples above. By definition, an anomaly detection solution (such as those mentioned in the background) would indicate whether x is anomalous or not. The output of such anomaly detection is simply anomalous or non-anomalous and nothing else. Embodiments described herein, by contrast, indicate why sample x is considered anomalous (e.g., because of a 40% increase in feature-1, CPU utilization of server A, and a 33% decrease in feature-3, network IO of server A).

It will be appreciated that the plurality of features in each data sample are each associated with different aspects of the environment. Therefore, the one or more features in the anomalous data sample that are responsible for the anomalous data sample being anomalous are associated with one or more respective aspects of the environment that caused the anomalous data sample to be anomalous. Therefore, by providing an indication of which features are responsible, an explanation as to the cause of the anomaly is provided.

In some examples, the environment comprises a cloud system. In these examples, the plurality of features may comprise two or more of: memory utilization by a server, processing power utilization by a server, and time attributed to sending data between monitored processes at a server.

In some examples, the environment comprises a radio access network. In these examples, the plurality of features may comprise two or more of:

quality parameters associated with operation of a base station in the radio access network;
an active number of downlink and uplink users per Time Transmission Interval (TTI)
downlink and uplink scheduling entities per TTI
a number of RRC connection attempts
an average and maximum number of Radio Resource Control (RRC) connected users
downlink and uplink data volume for Data Radio Bearer (DRB) traffic
downlink and uplink data volume for Signaling Radio Bearer (SRB) traffic
downlink and uplink Physical Resource Block (PRB) utilization
physical Downlink Control Channel (PDCCH) Control Channel Element (CCE) load
an average Channel Quality Indicator (CQI)
a rate of occurrence of the channel quality indicators (CQI) 0-6
downlink and uplink user throughput
downlink and uplink cell throughput
a number of radio Access Channel (RACH) attempts
a radio Access Channel (RACH) success ratio
a downlink and uplink Hybrid ARQ (HARQ) discontinuous transmission ratio
an average Physical Uplink Shared Channel (PUSCH) Signal-to-Noise-Ratio (SINR)
an average Physical Uplink Control Channel (PUCCH) SINR
a PUSCH SINR below −2 dB rate a PUCCH SINR below 0 dB rate
a PUSCH interference level
a PUCCH interference level
an average pathloss
a pathloss below 130 dB rate
a UE power limitation rate
an average processor load
a 90th percentile of processor load It will also be appreciated that embodiments described herein may be applied to any environment in which features can be extracted that are representative of the environment. For example, the environment may comprise a core network environment.

Figure 9:
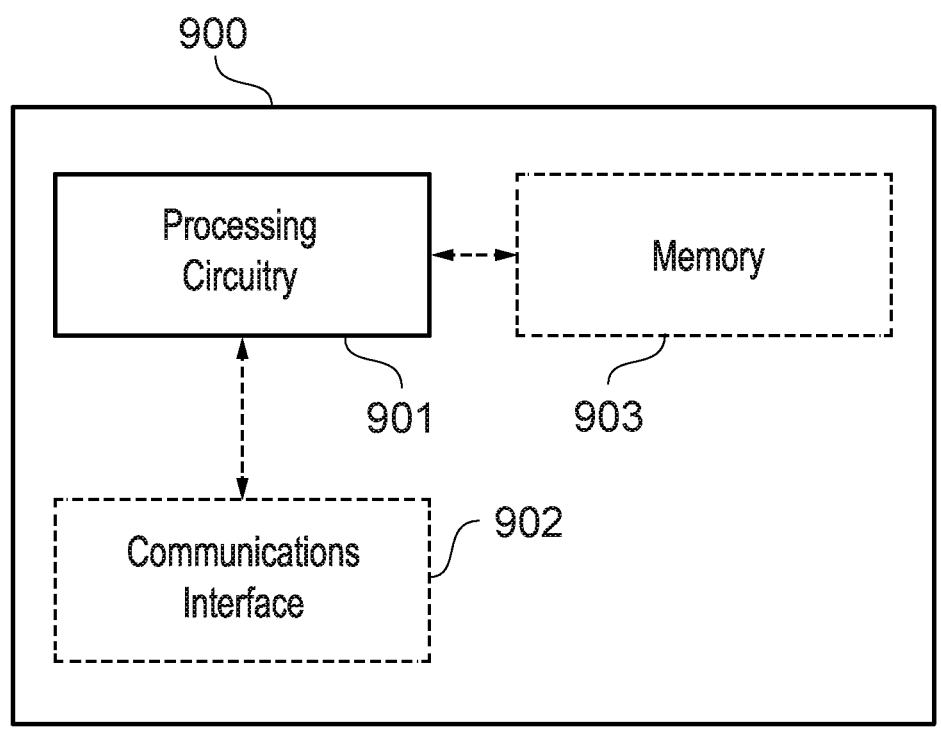
FIG. 9 illustrates an apparatus comprising processing circuitry (or logic)

FIG. 9 illustrates an apparatus 900 comprising processing circuitry (or logic) 901. The processing circuitry 901 controls the operation of the apparatus 900 and can implement the method described herein in relation to an apparatus 900. The processing circuitry 901 can comprise one or more processors, processing units, multi-core processors or modules that are configured or programmed to control the apparatus 900 in the manner described herein. In particular implementations, the processing circuitry 901 can comprise a plurality of software and/or hardware modules that are each configured to perform, or are for performing, individual or multiple steps of the method described herein in relation to the apparatus 900.

It will be appreciated that the apparatus may implement the modules illustrated in FIG. 1. It will also be appreciated that the apparatus may be distributed across different physically node in a network.

Briefly, the processing circuitry 901 of the apparatus 900 is configured to: determine a respective first threshold for each of the plurality of features based on respective maximum reconstruction errors for each feature found during training of the encoder-decoder machine learning model; obtain an anomalous data sample; determine respective reconstruction errors for each feature in the anomalous data sample using the trained encoder-decoder machine learning model; and determine one or more features in the anomalous data sample that are responsible for the anomalous data sample being anomalous responsive to the reconstruction errors associated with the one or more features being greater than or equal to the respective first thresholds.

In some embodiments, the apparatus 900 may optionally comprise a communications interface 902. The communications interface 902 of the apparatus 900 can be for use in communicating with other nodes, such as other virtual nodes. For example, the communications interface 902 of the apparatus 900 can be configured to transmit to and/or receive from other nodes requests, resources, information, data, signals, or similar. The processing circuitry 901 of apparatus 900 may be configured to control the communications interface 902 of the apparatus 900 to transmit to and/or receive from other nodes requests, resources, information, data, signals, or similar.

Optionally, the apparatus 900 may comprise a memory 903. In some embodiments, the memory 903 of the apparatus 900 can be configured to store program code that can be executed by the processing circuitry 901 of the apparatus 900 to perform the method described herein in relation to the apparatus 900. Alternatively or in addition, the memory 903 of the apparatus 900, can be configured to store any requests, resources, information, data, signals, or similar that are described herein. The processing circuitry 901 of the apparatus 900 may be configured to control the memory 903 of the apparatus 900 to store any requests, resources, information, data, signals, or similar that are described herein.

Figure 10:
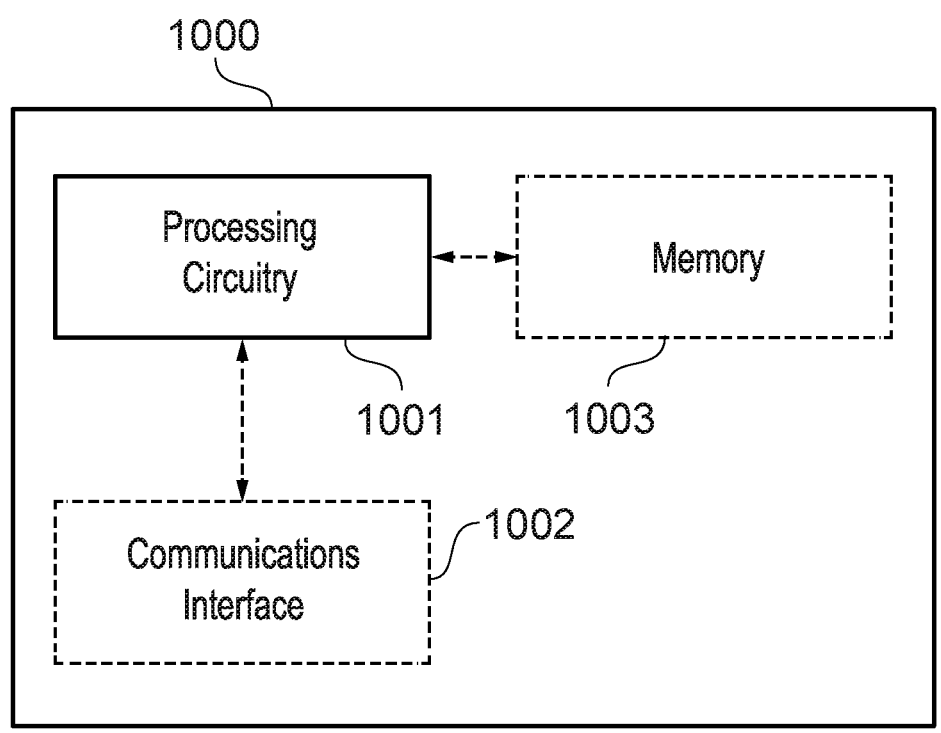
FIG. 10 is a block diagram illustrating an apparatus in accordance with an embodiment.

FIG. 10 is a block diagram illustrating an apparatus 1000 in accordance with an embodiment. The apparatus 1000 can detect and explaining anomalies in data obtained from an environment using an encoder-decoder machine learning model, wherein a state of the environment is represented by a plurality of features, and wherein the encoder-decoder machine learning model is trained with a first set of data samples, and each data sample in the first set of data samples comprises values for each of the plurality of features.

It will be appreciated that the apparatus 1000 may be implemented by the modules illustrated in FIG. 1. It will also be appreciated that the apparatus may be distributed across different physically node in a network.

The apparatus 1000 comprises a first determining module 1002 configured to determine a respective first threshold for each of the plurality of features based on respective maximum reconstruction errors for each feature found during training of the encoder-decoder machine learning model. The apparatus comprises an obtaining module 1004 configured to obtain an anomalous data sample. The apparatus 1000 comprises a second determining module 1006 configured to determine respective reconstruction errors for each feature in the anomalous data sample using the trained encoder-decoder machine learning model. The apparatus 1000 comprises a third determining module 1010 configured to determine one or more features in the anomalous data sample that are responsible for the anomalous data sample being anomalous responsive to the reconstruction errors associated with the one or more features being greater than or equal to the respective first thresholds.

The apparatus 1000 may operate in the manner described herein in respect of an apparatus.

There is also provided a computer program comprising instructions which, when executed by processing circuitry (such as the processing circuitry 901 of the apparatus 900 described earlier, cause the processing circuitry to perform at least part of the method described herein. There is provided a computer program product, embodied on a non-transitory machine-readable medium, comprising instructions which are executable by processing circuitry to cause the processing circuitry to perform at least part of the method described herein. There is provided a computer program product comprising a carrier containing instructions for causing processing circuitry to perform at least part of the method described herein. In some embodiments, the carrier can be any one of an electronic signal, an optical signal, an electromagnetic signal, an electrical signal, a radio signal, a microwave signal, or a computer-readable storage medium.

Embodiments described herein provide explainable multivariate anomaly detection.

The multivariate anomaly detection may be able to detect more anomalies than those that are univariate.

The explanation of which features cause the anomaly may improve the time required to perform root cause analysis (RCA) of an issue/problem by pinpointing where the RCA solution should focus. RCA is a process of involves determining what underlying problem caused the detected anomaly and where the problem is located. Previous solutions of multivariate anomaly detection would not have been helpful for RCA. However, by providing an explanation as to which features of the anomaly are responsible for making the sample anomalous allows the RCA to focus on particular issues to determine root cause and any potential solutions.

Embodiments described herein may be performed online for timely anomaly detection.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method of detecting and explaining anomalies in data obtained from an environment using an encoder-decoder machine learning model, wherein a state of the environment is represented by a plurality of features, and wherein the encoder-decoder machine learning model is trained with a first set of data samples, and each data sample in the first set of data samples comprises values for each of the plurality of features, the method comprising:
- determining a respective first threshold for each of the plurality of features based on respective maximum reconstruction errors for each feature found during training of the encoder-decoder machine learning model;
- obtaining an anomalous data sample;
- determining respective reconstruction errors for each feature in the anomalous data sample using the trained encoder-decoder machine learning model; and
- determining one or more features in the anomalous data sample that are responsible for the anomalous data sample being anomalous responsive to the reconstruction errors associated with the one or more features being greater than or equal to the respective first thresholds.

2. The method of claim 1, wherein the first set of data samples is assumed to contain no anomalies.

3. The method of claim 1, further comprising training the encoder-decoder machine learning model with the first set of data samples.

4. The method of claim 1, wherein the respective first threshold for each of the plurality of features is equal to the maximum reconstruction error for the respective feature.

5. The method of claim 1, wherein the respective first threshold for each of the plurality of features is greater than 95th percentile of the maximum reconstruction error for the respective feature.

6. The method of claim 1, wherein the respective first threshold for each of the plurality of features is set to the Nth percentile of the maximum reconstruction error for the respective feature responsive to the first set of data samples comprising (100−N) % anomalies, where N is an numerical value.

7. The method of claim 1, further comprising training a sensitivity analysis model, wherein the sensitivity analysis model comprises a mapping function, by:
 a. adding respective known noise signals to one or more samples in the first set of data samples to generate a noisy set of data samples;
 b. for each sample in the noisy set of data samples:
  i. inputting the sample into the trained encoder-decoder machine learning model to determine reconstruction errors for each feature in the sample; and
  ii. determining which one or more features in the sample comprise noise signals by comparing the respective reconstruction errors for each feature to the respective first threshold; and
 c. determining the mapping function such that the mapping function maps the reconstruction errors for features comprising a noise signal to the respective known noise signals added in step a.

8. The method of claim 7, wherein the step of determining the mapping function comprises using multiple linear regression to determine a correlation between the reconstruction errors for features comprising a noise signal and two variables, wherein the two variables comprise the known noise signals and a number of noisy features in each data sample in the noisy set of data samples.

9. The method of claim 8, further comprising:
for each of the one or more features that are responsible for the anomalous data sample being anomalous:
determining a noise level associated with the feature by using the mapping function to map a reconstruction error for the feature to a noise level.

10. The method of claim 1, further comprising:
determining a second threshold based on a maximum average sample reconstruction error for the first set of data samples found during the training step, wherein an average sample reconstruction error for a sample is the average of the reconstruction errors for the features in said sample.

11. The method of claim 10, wherein the step of obtaining an anomalous data sample comprises:
obtaining a first data sample in a second set of data samples;
inputting the first data sample into the encoder-decoder machine learning model to determine a first average sample reconstruction error for the first data sample;
comparing the first average sample reconstruction error to the second threshold; and
responsive to the first average sample reconstruction error being greater than the second threshold setting the first data sample as the anomalous data sample.

12. The method of claim 11, further comprising:
responsive to the first average sample reconstruction error being less than or equal to the second threshold setting the first data sample as a normal data sample.

13. The method of claim 11, further comprising:
calculating a first score value as the difference between the first average sample reconstruction error and the second threshold.

14. The method of claim 11, wherein
the step of obtaining an anomalous data sample comprises:
determining a reconstruction error for each feature in the first data sample based on an output of the encoder-decoder machine learning model;
comparing each reconstruction error to the respective first thresholds for each feature; and
responsive to at least one of the reconstruction errors being greater than the respective first threshold, setting the first data sample as the anomalous data sample.

15. The method of claim 14, further comprising:
responsive to all of the reconstruction errors being less than or equal to the respective first thresholds, setting the first data sample as a normal data sample.

16. The method of claim 14, further comprising:
calculating a second score values for each feature as the difference between the reconstruction errors and the respective first thresholds;
sorting the one or more features in the anomalous data sample that are responsible for the anomalous data sample being anomalous based on the second score values associated with each of the one or more features.

17. The method of claim 1, wherein the first set of data samples and the anomalous sample have been normalized.

18. The method of claim 1, wherein the first set of data samples is calculated based on a rate of change of an original set of data samples.

19. An apparatus for detecting and explaining anomalies in data obtained from an environment using an encoder-decoder machine learning model, wherein a state of the environment is represented by a plurality of features, and wherein the machine learning model is trained with a first set of data samples, and each data sample in the first set of data samples comprises values for each of the plurality of features, the apparatus comprising processing circuitry configured to cause the apparatus to perform the method of claim 1.

20. A non-transitory computer readable storage medium storing a computer program comprising instructions which, when executed on at least one processor, cause the at least one processor to carry out the method of claim 1.

\* \* \* \* \*